（12） United States Patent
Helms

(10) Patent No.: US 11,323,283 B2
(45) Date of Patent: May 3, 2022

(54) DOMESTIC APPLIANCE COMMISSIONING

(71) Applicant: Haier US Appliance Solutions, Inc., Wilmington, DE (US)

(72) Inventor: Chad Michael Helms, Lousiville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 16/802,818

(22) Filed: Feb. 27, 2020

(65) Prior Publication Data
US 2021/0273822 A1 Sep. 2, 2021

(51) Int. Cl.
H04L 12/28 (2006.01)

(52) U.S. Cl.
CPC ........ *H04L 12/2838* (2013.01); *H04L 12/282* (2013.01); *H04L 12/2825* (2013.01); *H04L 12/2836* (2013.01); *H04L 2012/285* (2013.01); *H04L 2012/2841* (2013.01)

(58) Field of Classification Search
CPC .............. H04L 12/2838; H04L 12/282; H04L 12/2825; H04L 12/2836; H04L 2012/285; H04L 2012/2841
See application file for complete search history.

(56) References Cited

U.S. PATENT DOCUMENTS

| 9,137,662 | B2 | 9/2015 | Dolenc |
| 9,712,486 | B2 | 7/2017 | Johnson et al. |
| 9,998,437 | B2 | 6/2018 | Kim et al. |
| 10,070,289 | B1 | 9/2018 | Inamdar et al. |
| 10,075,334 | B1 | 9/2018 | Kozura et al. |
| 2009/0138947 | A1* | 5/2009 | Schneider ............... G06F 21/33 726/5 |
| 2013/0223279 | A1* | 8/2013 | Tinnakornsrisuphap ................... H04W 4/80 370/254 |
| 2014/0045454 | A1* | 2/2014 | Monjas Llorente .... H04W 4/70 455/406 |
| 2015/0071052 | A1* | 3/2015 | Hershberg ............ H04W 24/04 370/216 |
| 2015/0373753 | A1* | 12/2015 | Turon ................. H04W 12/041 370/254 |
| 2016/0294828 | A1* | 10/2016 | Zakaria ................. H04W 12/06 |
| 2017/0250974 | A1* | 8/2017 | Antonyraj ............ H04L 9/3228 |
| 2017/0353859 | A1* | 12/2017 | Idnani ................... H04W 12/08 |
| 2018/0152443 | A1 | 5/2018 | Henrique Minatel et al. |
| 2018/0227128 | A1* | 8/2018 | Church ............... H04L 63/0853 |
| 2019/0026716 | A1* | 1/2019 | Anbukkarasu ....... G06Q 20/389 |
| 2019/0052683 | A1 | 2/2019 | Logue et al. |
| 2019/0116087 | A1* | 4/2019 | Hiller ...................... H04L 67/12 |
| 2019/0116205 | A1* | 4/2019 | Chen .................... H04L 63/0281 |

(Continued)

FOREIGN PATENT DOCUMENTS

| EP | 3511628 A1 | 7/2019 |
| KR | 20180103892 A | 9/2018 |

*Primary Examiner* — Hoang-Chuong Q Vu

(74) *Attorney, Agent, or Firm* — Dority & Manning, P.A.

(57) ABSTRACT

Methods for commissioning a domestic appliance, as provided herein, may include the transmission and receiving of signals between the domestic appliance, a previously-commissioned appliance, a remote user-interface device, and a remote server such that a network credential for a local wireless network is transmitted from the previously-commissioned appliance to the domestic appliance.

11 Claims, 6 Drawing Sheets

(56) References Cited

U.S. PATENT DOCUMENTS

| | | | |
|---|---|---|---|
| 2019/0363904 A1* | 11/2019 | Drake | H04L 12/2809 |
| 2020/0037159 A1* | 1/2020 | Jones | H04B 11/00 |
| 2020/0169460 A1* | 5/2020 | Bartlett | H04W 8/18 |
| 2020/0169886 A1* | 5/2020 | Bhatt | H04L 63/1441 |
| 2020/0187001 A1* | 6/2020 | Ard | H04L 67/12 |
| 2020/0213101 A1* | 7/2020 | Zimmerman | H04L 9/3297 |
| 2020/0404501 A1* | 12/2020 | Kang | H04W 12/06 |
| 2021/0084466 A1* | 3/2021 | Jain | H04W 8/005 |

* cited by examiner

DOMESTIC APPLIANCE COMMISSIONING

FIELD OF THE INVENTION

The present subject matter relates generally to domestic appliances that can connect to a home network or a remote network such as the internet, and more particularly, to improved commissioning of such appliances to a user account.

BACKGROUND OF THE INVENTION

Domestic (e.g., household) appliances are utilized generally for a variety of tasks by a variety of users. For example, a household may include such appliances as laundry appliances (e.g., a washing machine or dryer appliance), kitchen appliances (e.g., a refrigerator, a microwave, a coffee maker, etc.), along with room air conditioners and various other appliances.

Some domestic appliances can also include features for connecting to and communicating over a secure wireless network. Such communication may provide connected features on the domestic appliances to permit the domestic appliance to communicate with a personal device, smart home systems, or a remote database such as a cloud server.

Existing domestic appliances that can connect to a secure wireless network generally require multiple processes using multiple user interfaces in order to establish a connection or association, in particular an initial connection or association, between the domestic appliance and a user account. For instance, in order to commission an appliance, a user may be required to connect an existing device, such as a phone, to the appliance via a temporary connection while the user performs certain steps on the existing device. In particular, in existing domestic appliances, a user must select a local wireless network (e.g., WI-FI® network) through which the appliance may connect to on a continuous basis. If the local wireless network is restricted by a password or access phrase, the user will also be required to provide the correct password to access the local wireless network (e.g., as a network credential). Although such passwords may be useful in securing or protecting the network, it can be difficult for users to remember and correctly provide (e.g., type) the password. These difficulties may greatly reduce a user's satisfaction with the appliance and hinder use of the appliance. Moreover, the difficulties may be especially magnified if a user has multiple appliances. If multiple appliances are being commissioned by a service person, the tedious repetition of reentering passwords for each appliance may be costly and inefficient.

Accordingly, there exists a need for an appliance that can be connected to a secured wireless network and added to a user account in an easier or more secure manner.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of commissioning a domestic appliance is provided. The method may include opening a connection channel at a wireless access point on the domestic appliance. The method may further include establishing communication between a remote user interface device and the wireless access point via the open connection channel. The method may still further include receiving a network credential at the domestic appliance from a previously-commissioned appliance subsequent to establishing communication between the remote user interface device and the wireless access point.

In another exemplary aspect of the present disclosure, a method of commissioning a domestic appliance is provided. The method may include receiving a commissioning request for the domestic appliance at a remote server. The method may further include transmitting a request for a network credential of a local wireless network to a previously-commissioned appliance, the request being transmitted through the local wireless network. The method may still further include receiving the network credential from the previously-commissioned appliance, and transmitting the network credential to the domestic appliance.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
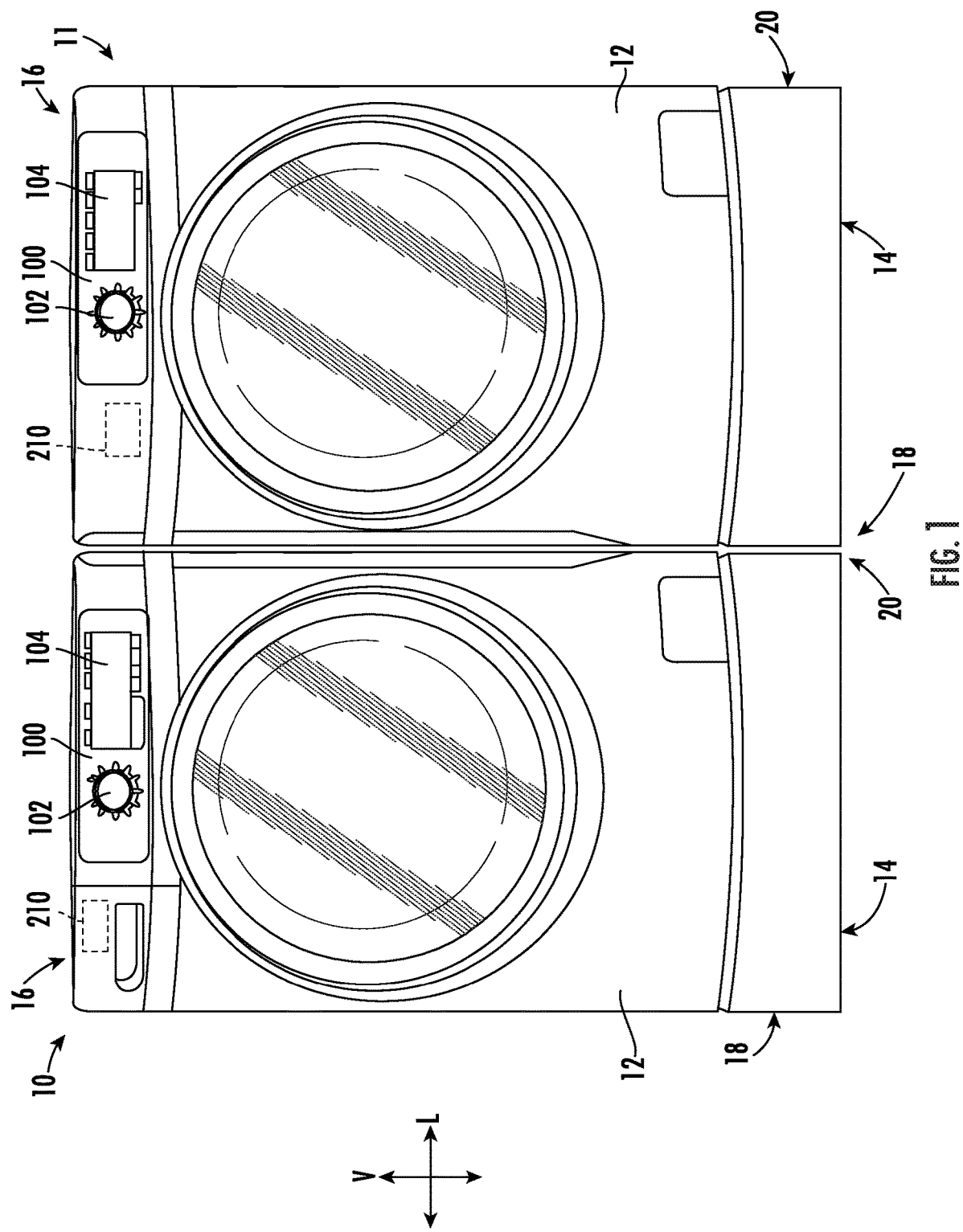
FIG. 1 provides a front, elevation view of laundry appliances in accordance with exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
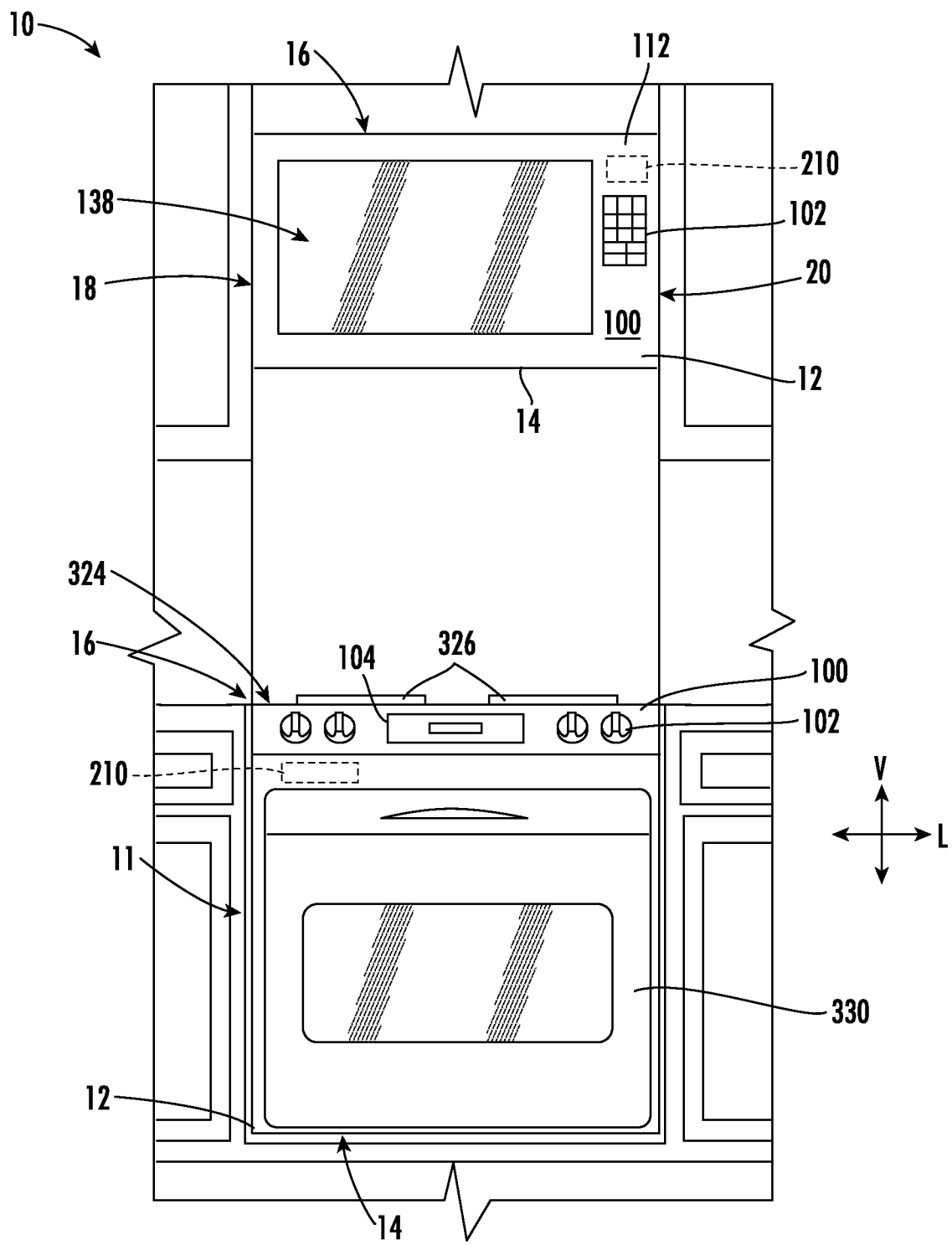
FIG. 2 provides a front, elevation view of kitchen appliances in accordance with exemplary embodiments of the present disclosure.

As may be seen in FIGS. 1 and 2, in accordance with one or more embodiments of the present disclosure, one or more appliances, such as a first appliance 10 and a second appliance 11, may be provided. The illustrated group of two appliances is provided by way of example only. Various embodiments of the present subject matter may also include additional (e.g., three or more) appliances.

As generally shown throughout FIGS. 1 and 2, each appliance 10 and 11 includes a cabinet 12 that defines a vertical direction V, a lateral direction L and a transverse direction T that are mutually perpendicular. Each cabinet 12 extends between a top side 16 and a bottom side 14 along the vertical direction V. Each cabinet 12 also extends between a left side 18 and a right side 20 (e.g., along the lateral direction L) and a front side 22 and a rear side 24 (e.g., along the transverse direction T).

Each appliance 10 and 11 may include a user interface panel 100 and a user input device 102 that may be positioned on an exterior of the cabinet 12. The user input device 102 is generally positioned proximate to the user interface panel 100, and in some embodiments, the user input device 102 may be positioned on the user interface panel 100.

In various embodiments, the user interface panel 100 may represent a general purpose I/O ("GPIO") device or functional block. In some embodiments, the user interface panel 100 may include or be in operative communication with user input device 102, such as one or more of a variety of digital, analog, electrical, mechanical or electro-mechanical input devices including rotary dials, control knobs, push buttons, and touch pads. The user interface panel 100 may include a display component 104, such as a digital or analog display device designed to provide operational feedback to a user. The display component 104 may also be a touchscreen capable of receiving a user input, such that the display component 104 may also be a user input device in addition to or instead of the user input device 102.

Generally, each appliance 10 and 11 may include a controller 210 in operative communication with the user input device 102. The user interface panel 100 and the user input device 102 may be in communication with the controller 210 via, for example, one or more signal lines or shared communication busses. Input/output ("I/O") signals may be routed between controller 210 and various operational components of the appliances 10 and 11. Operation of the appliances 10 and 11 may each be regulated by the respective controller 210 that is operatively coupled to the corresponding user interface panel 100. A user interface panel 100 may, for example, provide selections for user manipulation of the operation of an appliance (e.g., via user input device 102 or display 104). In response to user manipulation of the user interface panel 100 or user input device 102, the controller 210 may operate various components of the appliance 10 or 11. Each controller 210 may include a memory and one or more microprocessors, CPUs or the like, such as general or special purpose microprocessors operable to execute programming instructions or microcontrol code associated with operation of the appliance 10 or 11. The memory may represent random access memory such as DRAM, or read only memory such as ROM or FLASH. In one embodiment, the processor executes programming instructions stored in memory. The memory may be a separate component from the processor or may be included onboard within the processor. Alternatively, a controller 210 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

The controller 210 may be programmed to operate the respective appliance 10 or 11 by executing instructions stored in memory. For example, the instructions may be software or any set of instructions that when executed by the processing device, cause the processing device to perform operations. Controller 210 can include one or more processor(s) and associated memory device(s) configured to perform a variety of computer-implemented functions or instructions (e.g. performing the methods, steps, calculations and the like and storing relevant data as disclosed herein). It should be noted that controllers 210 as disclosed herein are capable of and may be operable to perform any methods and associated method steps (e.g., as, or as part of, a commissioning operation) as disclosed herein.

In some embodiments, a pair of laundry appliances may be provided as the first appliance 10 or the second appliance 11. In the exemplary embodiment illustrated in FIG. 1, the first appliance 10 may be a washing machine appliance and the second appliance 11 may be a dryer appliance. In embodiments such as illustrated in FIG. 1, the user input device 102 of each appliance 10 and 11 may be positioned on the user interface panel 100. The embodiment illustrated in FIG. 1 also includes a display 104 on the user interface panel 100.

FIG. 2 illustrates another exemplary embodiment of a group of appliance where the first appliance 10 or the second appliance 11 is/are kitchen appliances. In this example, the first appliance 10 is a microwave oven appliance that is generally positioned above the second appliance 11, which is a cooktop appliance (e.g., along the vertical direction V).

Microwave oven appliance as first appliance 10 includes a cabinet 12. A cooking chamber is defined within the cabinet 12 of the microwave oven appliance. The cooking chamber is accessible via a door 112 and viewable through a window 138 in the door 112. The microwave oven appliance is configured to heat articles (e.g., food or beverages) within the cooking chamber using electromagnetic radiation. The microwave oven appliance may include various components which operate to produce the electromagnetic radiation, as is generally understood. For example, the microwave oven appliance may include a magnetron (such as, for example, a cavity magnetron), a high voltage transformer, a high voltage capacitor and a high voltage diode. The transformer may provide energy from a suitable energy source (such as an electrical outlet) to the magnetron. The magnetron may convert the energy to electromagnetic radiation, specifically microwave radiation. The capacitor generally connects the magnetron and transformer, such as via high voltage diode, to a chassis. Microwave radiation produced by the magnetron may be transmitted through a waveguide to the cooking chamber. The structure and intended function of microwave ovens are generally understood by those of ordinary skill in the art and are not described in further detail herein.

As shown, cooktop appliance as second appliance 11 includes a chassis or cabinet 12 that extends along the vertical direction V between a top side 16 and a bottom side 14. The cooktop appliance can include a cooktop surface 324 having one or more heating elements 326 for use in, for example, heating or cooking operations. In exemplary embodiments, cooktop surface 324 is constructed with ceramic glass. In other embodiments, however, cooktop surface 324 may include any another suitable material, such as a metallic material (e.g., steel) or another suitable non-metallic material. Heating elements 326 may be various sizes and may employ any suitable method for heating or cooking an object, such as a cooking utensil (not shown), and its contents. In one embodiment, for example, heating element 326 uses a heat transfer method, such as electric coils or gas burners, to heat the cooking utensil. In another embodiment, however, heating element 326 uses an induction heating method to heat the cooking utensil directly. In various embodiments, the heating elements 326 may include one or more of a gas burner element, resistive heat element, radiant heat element, induction element, or another suitable heating element.

In some embodiments, the cabinet 12 of the cooktop appliance may be insulated and may define a cooking chamber selectively enclosed by a door 330. One or more heating elements (e.g., top broiling elements or bottom baking elements) may be positioned within cabinet 12 of the cooktop appliance to heat the cooking chamber. Heating elements within cooking chamber may be provided as any suitable element for cooking the contents of cooking chamber, such as an electric resistive heating element, a gas burner, a microwave element, a halogen element, etc. Thus, the cooktop appliance may be referred to as an oven range appliance. As will be understood by those skilled in the art, the cooktop appliance is provided by way of example only, and the present subject matter may be used in the context of any suitable cooking appliance, such as a double oven range appliance or a standalone cooktop (e.g., fitted integrally with a surface of a kitchen counter). Thus, the exemplary embodiments illustrated and described are not intended to limit the present disclosure to any particular cooking chamber or heating element configuration, unless explicitly indicated as such.

As illustrated, a user interface panel 100 may be provided on the cooktop appliance 1. Although shown at front portion of the cooktop appliance, another suitable location or structure (e.g., a backsplash) for supporting user interface panel 100 may be provided in alternative embodiments. In some embodiments, user interface panel 100 includes input components or controls 102, such as one or more of a variety of electrical, mechanical, or electro-mechanical input devices. Controls 102 may include, for example, rotary dials, knobs, push buttons, and touch pads. A controller 210 is in communication with user interface panel 100 and controls 102 through which a user may select various operational features and modes and monitor progress of the cooktop appliance. In additional or alternative embodiments, user interface panel 100 includes a display component, such as a digital or analog display in communication with a controller 210 and configured to provide operational feedback to a user. In certain embodiments, user interface panel 100 represents a general purpose I/O ("GPIO") device or functional block.

As shown, controller 210 is communicatively coupled (i.e., in operative communication) with user interface panel 100 and its controls 102. Controller 210 may also be communicatively coupled with various operational components of cooktop appliance 300 as well, such as heating elements (e.g., 326, 332), sensors, and the like. Input/output ("I/O") signals may be routed between controller 210 and the various operational components of the cooktop appliance. Thus, controller 210 can selectively activate and operate these various components. Various components of the cooktop appliance are communicatively coupled with controller 210 via one or more communication lines such as, for example, conductive signal lines, shared communication busses, or wireless communications bands.

According to various embodiments of the present disclosure, the appliances 10 or 11 may take the form of any of the examples described above, or may be any other domestic appliance where improved ease of commissioning the appliance is desired. Thus, it will be understood that the present subject matter is not limited to any particular domestic appliance.

Figure 3:
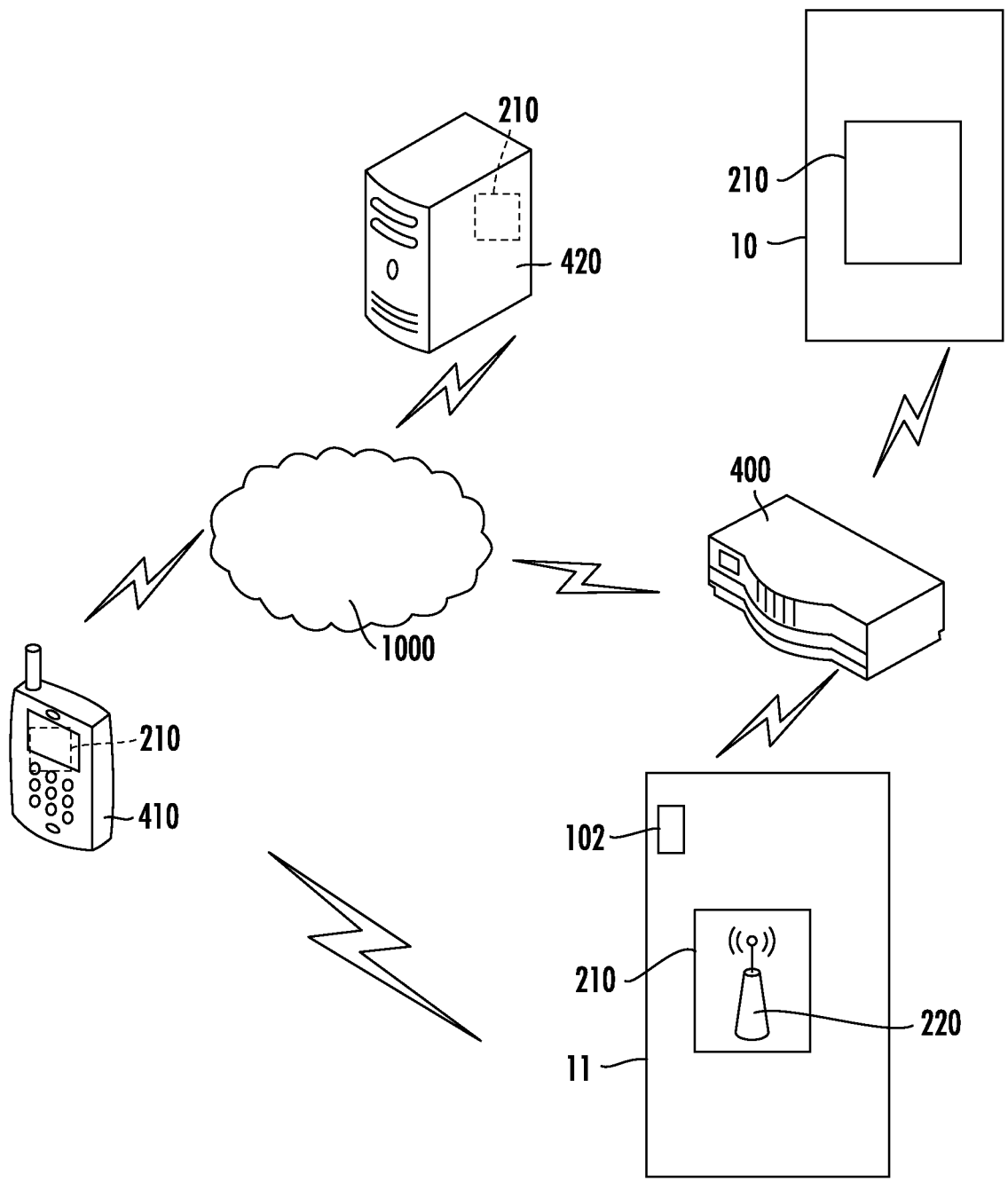
FIG. 3 provides a schematic view of an appliance being commissioned with a user device according to exemplary embodiments of the present disclosure.
Figure 4:
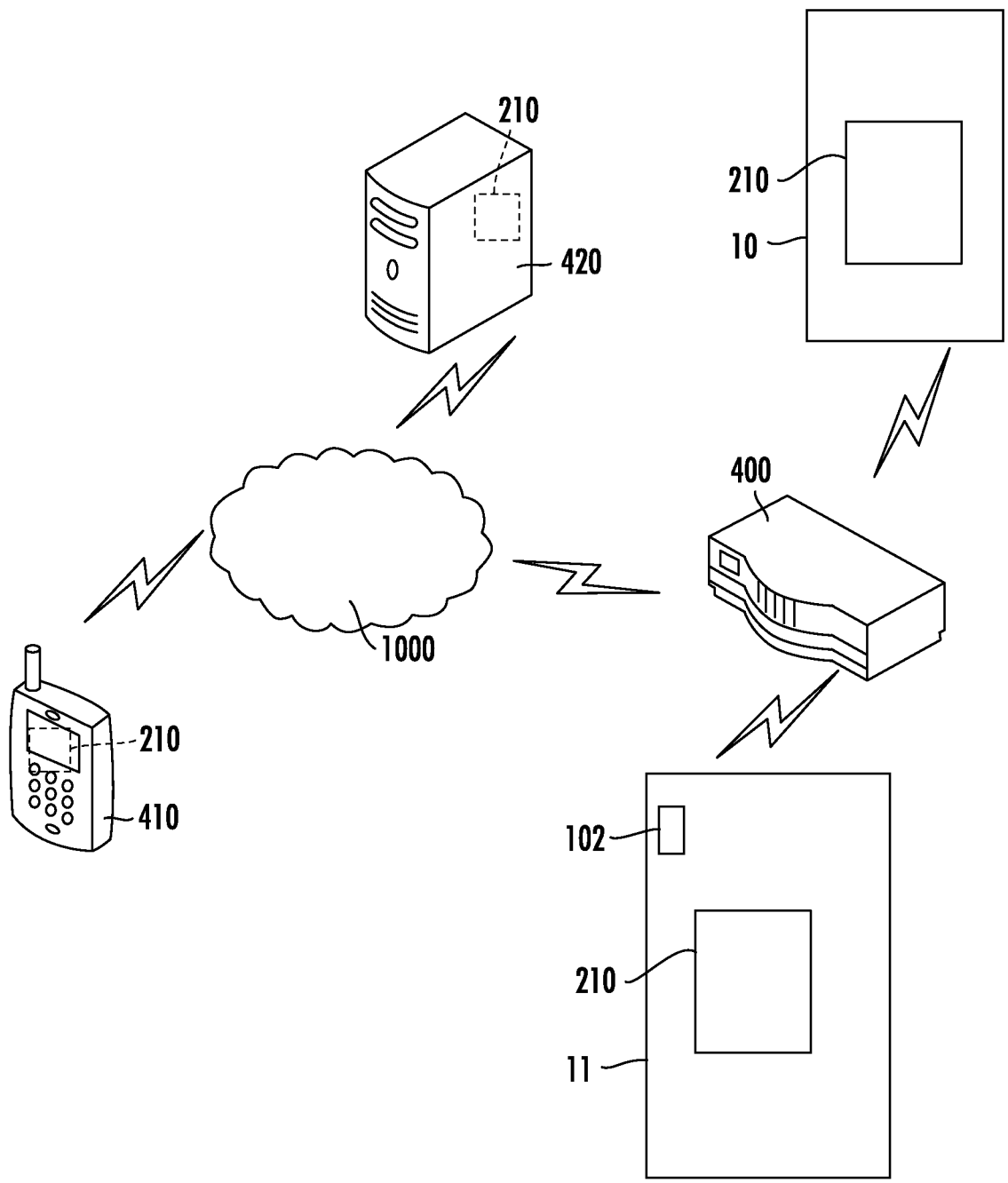
FIG. 4 provides a schematic view of an appliance prior to being commissioned according to exemplary embodiments of the present disclosure.

Turning now generally to FIGS. 3 and 4, an appliance (e.g., first appliance 10 or second appliance 11—FIGS. 1 and 2) may be configured to communicate with one or more separate, external devices. For instance, appliances 10, 11 may be configured to communicate with each other, a remote user interface device 410, or a remote server 420, either directly or via one or more intermediate networks (e.g., a wide area network 1000, such as the internet). In other words, a controller 210 of one appliance (e.g., second appliance 11) may be configured to communication with a separate controller 210 of another appliance (first appliance 10), In some embodiments, the appliances 10 and 11 can access the wide area network 1000 via an access point, such as a modem or router 400, which may be part of a local, wireless network (e.g., WI-FI® or wireless network having a frequency between 2.4 GHz and 6 GHz).

The remote user interface device 410 may be a laptop computer, smartphone, tablet, personal computer, wearable device, smart home system, or various other suitable devices including a user interface (e.g., buttons or touchscreen display). In some embodiments, the remote user interface device 410 includes a controller 210 having a memory (e.g., non-transitive storage media) for storing and retrieving programming instructions. For example, the remote user interface device 410 may be a smartphone operable to store and run applications (i.e., "apps") and may include a remote user interface provided as a smartphone app. During use, an appliance (e.g., appliance 11) may be in communication with the separate external device 410 or 420 through various possible communication connections and channels, such as but not limited to wireless radio frequency (RF) channels (e.g., ZIGBEE®, BLUETOOTH®, WI-FI®, etc.) or any other suitable communication connection.

Methods and systems according to the present disclosure advantageously provide a smoother and more convenient user experience when commissioning one or more new domestic appliances (e.g., second appliance 11). For example, commissioning the second appliance 11 may include connecting the second appliance 11 to a local wireless (e.g., RF, WI-FI®, etc.) network for the first time or adding the second appliance 11 to a user account on the remote server 420.

FIG. 3 provides a schematic view of first appliance 10 communicating with second appliance 11 (e.g., via a remote user interface device 410 and remote server 420) during a commissioning operation (e.g., for the first time). In particular, first appliance 10 may indirectly supply a network credential to second appliance 11, as will be described in detail below. In some embodiments, remote user interface device 410 can communicate with the controller 210 of the second appliance 11, such as through a soft access point (soft AP) 220 on the controller 210. First appliance 10 and remote user interface device 410 may communicate with the remote server 420 (e.g., via a router 400 connected to the wide area network 1000). Additionally or alternatively, first appliance 10 may be a previously-commissioned appliance that is connected directly to the router 400 (e.g., to communicate with remote server 420 through the wide area network 1000). In other words, first appliance 10 may be connected directly to the corresponding local wireless network (e.g., WI-FI® network) maintained by router 400.

It should be understood that two appliances 10 and 11 are illustrated by way of example only, in at least some embodiments, more than one new appliance (e.g., two new appliances, three new appliances, or more) may be commissioned at the same time.

In some embodiments, commissioning (e.g., a commissioning operation) of a new appliance (e.g., second appliance 11) is initiated by requesting to add the new appliance to a user account and by manipulating a user input 102 (e.g., pressing a button on the user interface of second appliance 11). Prior to or subsequent to manipulation of a user input at second appliance 11, a user may initiate the request to add the appliance 11 to the user's account at the remote user interface device 410 (e.g., by pressing a button or touchscreen on the remote user interface device 410 for the mobile app). The request to add the appliance 11 to the user account may be transmitted from the remote user interface device 410 and received by the server 420 via the wide area network 1000 (e.g., via the router 400, a cellular data network, etc.).

When the remote server 420 receives the request to add the new appliance 11, the remote server 420 may then scan for and identify one or more previously-commissioned appliances. For instance, the user's account may include a set of one or more previously-commissioned appliances (e.g., including first appliance 10) that are thus already associated with the user's account. From the set of one or more previously-commissioned appliances, one previously-commissioned appliance may be selected or identified (e.g., based on geographic location of the previously-commissioned appliances, which previously-commission appliance the remote server 420 most recently interacted with or received a signal from, which previously-commission appliance is connected to router 400, etc.). In the illustrated embodiment, the identified previously-commissioned appliance is represented at the first appliance 10. The scan or identification by the remote server 420 may be initiated in response to receiving the commissioning request.

Once a previously-commissioned appliance 10 is identified (e.g., in response thereto), the remote server 420 may transmit a request for a network credential (e.g., a password for the local wireless network or router 400). Thus, the previously-identified first appliance 10 may be identified by the remote server 420 prior to transmitting the request for the network credential. In some embodiments, the request is sent with or includes a public key of the new or second appliance 11 to encrypt the network credential. The network credential may be securely stored on the previous-commissioned first appliance 10 (e.g., to permit continued connection to and communication with router 400). As prompted by the request, the first appliance 10 may transmit the network credential (e.g., a duplicate thereof), which is received at the remote server 420. The network credential transmitted from the first appliance 10 to the remote server 420 may be encrypted, as previously noted. Thus, the transmitted network credential may be an encrypted credential, such that the network credential is not readable at the remote server 420. Subsequently, the remote server 420 may transmit the network credential (e.g., encrypted credential) to the remote user interface device 410 (e.g., for later transmittal to the second appliance 11). Through the remote user interface device 410, the network credential (e.g., encrypted credential) may be relayed or transmitted to the second appliance 11. Once received at the second appliance 11, the network credential may be decrypted, such as by using the corresponding private key of the second appliance 11. Additionally or alternatively, the network credential (e.g., encrypted credential) may be erased or deleted from remote server 420 (e.g., in response to transmission of the network credential to the remote user interface device 410).

Optionally, the identification of the first appliance 10, transmission of the request of the network credential to the first appliance 10, and subsequent transmission of the network credential to or through the remote user interface device 410 at the remote server 420 may occur automatically (e.g., without direct user input or control) following the server's receipt of the request to add second appliance 11. Advantageously, the network credential may be relayed to the new appliance (e.g., second appliance 11) without requiring a user to manually enter the same. Moreover, the complexity or demands on the user to complete the commissioning process may be reduced. In some such embodiments, the network credential is advantageously encrypted from one appliance to the next appliance such that the network credential is not compromised (e.g., at the remote server 420 or remote device 410).

Separate from or in addition to the actions at remote server 420, the second appliance 11 may enable the soft AP 220 of the second appliance 11 (e.g., in response to manipulation of the user input 102) after the commissioning operation is initiated. For instance, the soft AP 220 may open a connection channel (e.g., wireless RF channel) through which the remote user interface device 410 may connect to and communicate with the second appliance 11. Optionally, the connection channel opened at the soft AP 220 may be a single-device channel such that only a single, separate device may connect to the soft AP 220 at a time. In some embodiments, the soft AP 220 has a programed service set identifier (SSID) format. The SSID format may permit the remote user interface device 410 to recognize the soft AP 220 via the open connection channel. For example, the SSID format may be preprogrammed into a memory of the controller 210 and made visible to the remote user interface device 410 (e.g., such that a user can scan for and select the open connection channel at the soft AP 220 as a WI-FI® network connection).

In certain embodiments, the connection channel is time-restricted. Specifically, the connection channel may be subject to a timeout period (e.g., defined in seconds or minutes). Thus, the timeout period may begin to count down or run once the connection channel is opened (e.g., by enabling the soft AP 220). Once the timeout period expires (e.g., in response to expiration of the timeout period), the connection channel may be closed. For instance, the soft AP 220 may be disabled (e.g., regardless or irrespective of whether the commissioning have been completed).

Once recognized, the second appliance 11 may establish a secure connection with or to the remote user interface device 410 (e.g., after the soft AP 220 is selected by a user at the remote user interface device 410). For instance, the soft AP 220 may establish the secure connection with the remote user interface device 410 according to or with transport layer security (TLS) protocol. Thus, the connection channel may include a TLS protocol. Over the secure connection, the remote user interface device 410 may then receive a certificate from the second appliance 11 providing the soft AP 220. The certificate may subsequently be verified (e.g., by the remote user interface device 410). Additionally or alternatively, the second appliance 11 providing the soft AP 220 may also receive and verify a certificate from the remote user interface device 410.

Once connected to the remote user interface device 410, the second appliance 11 may send a device identifier (device ID) and passphrase from the second appliance 11 to the server 420 via the soft access point 220 and the remote user interface device 410 (e.g., from the soft access point 220, through the remote user interface device 410, and to the remote server 420). In at least some embodiments, the device ID and passphrase may be sent only after establishing a secure connection and verifying the certificate of the second appliance 11. The server 420 may then validates the device ID and the passphrase. After validating the device ID and passphrase, the remote server 420 may generate an account token.

The account token may be sent from the remote server 420 to the second appliance 11 via the soft AP 220 and the remote user interface device 410. For example, the server 420 may send the account token to the remote user interface device 410 (e.g., with the network credential previously transmitted to the remote server 420 from the first appliance 10, as described above). The remote user interface device 410 may then transmit or relay the account token or network credential to the second appliance 11 through the connection with the soft AP 220. In some embodiments, the account token (e.g., duplicate thereof) may also be maintained at the remote user interface device 410, such as to add the second appliance 11 to the appliances app running on the remote user interface device 410.

After receiving the network credential, the second appliance 11 may close the connection channel at the soft AP 220 and disconnect the soft AP 220 from the remote user interface device 410. For instance, the soft AP 220 may be disabled. If the network credential was previously encrypted, the second appliance 11 may decrypt the received credential with the corresponding private key. After closing the connection channel or disabling the soft AP 220, the second appliance 11 may connect directly to the local network. For instance, the second appliance 11 may apply the received or decrypted network credential (e.g., as a password for access) to connect directly to the user's local, wireless network (e.g., home WI-FI® network) via the router 400, as illustrated in FIG. 4. Once connected directly to the router 400, the second appliance 11 may then connect to the remote server 420 via the router 400 and wide area network 1000. Thus, the second appliance 11 may be able to communicate directly with the remote server 420 through the wide area network 1000 and wireless network of the router 400 subsequent to receiving the network credential (i.e., subsequent to the first appliance 10 transmitting the network credential to the second appliance 11). Additionally or alternatively, the second appliance 11 (e.g., controller 210 thereof) may transmit the account token to the remote server 420. The remote server 420 may use the account token to verify or permit the connection to second appliance 11. The server 420 may then associate the second appliance 11 with the user account.

Figure 5:
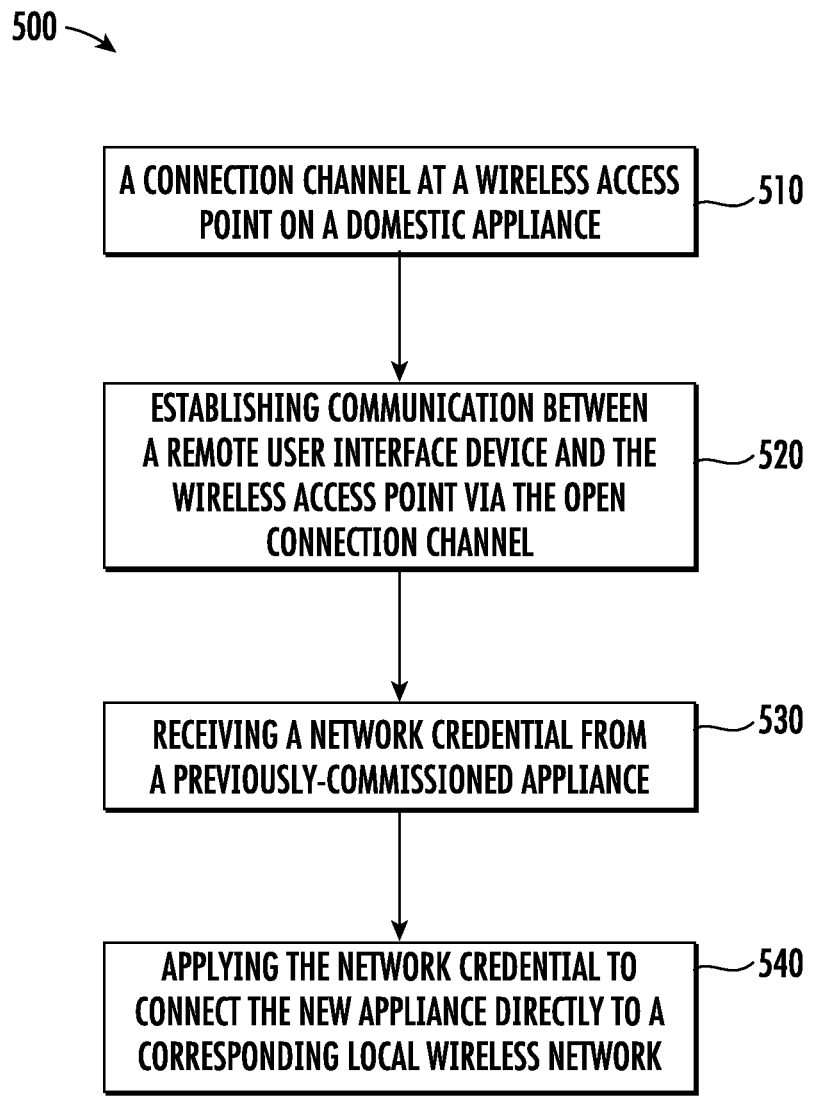
FIG. 5 provides a flow chart illustrating a method of commissioning an appliance according to exemplary embodiments of the present disclosure.
Figure 6:
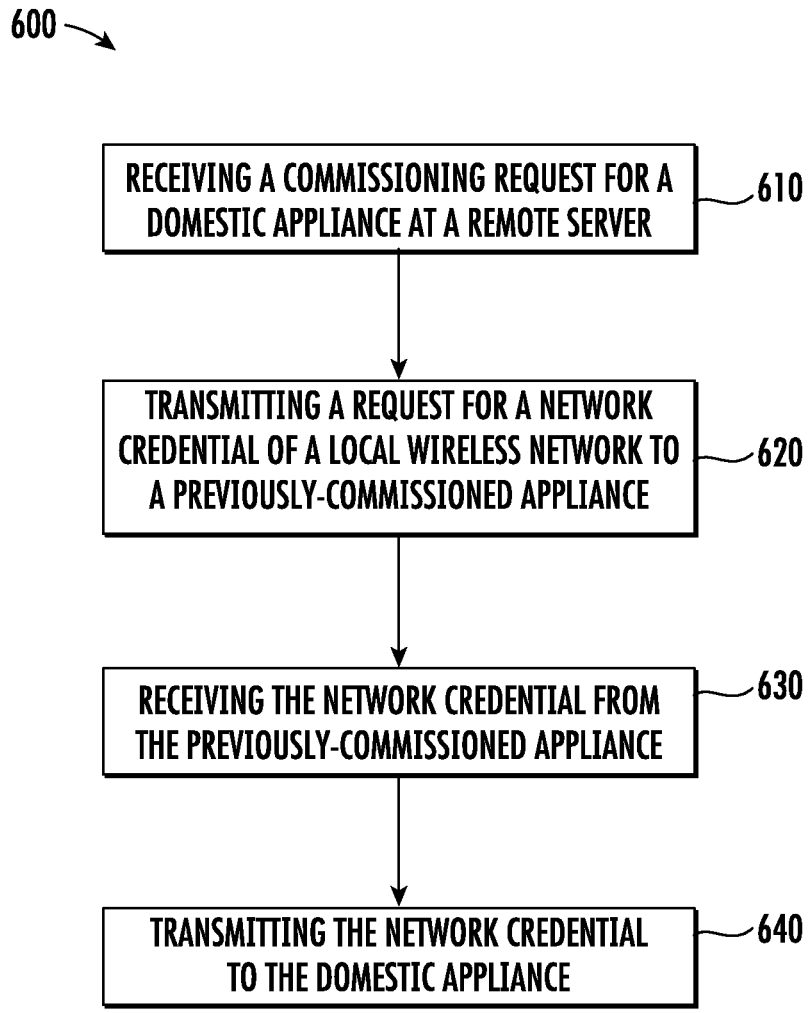
FIG. 6 provides a flow chart illustrating a method of commissioning an appliance according to exemplary embodiments of the present disclosure.

Turning now to FIGS. 5 and 6, various methods may be provided for use of a system, appliance (e.g., second appliance 11), or remote server (e.g., remote server 420) in accordance with the present disclosure. In general, the various steps of methods as disclosed herein may, in exemplary embodiments, be performed by one or more controllers 210 (e.g., of second appliance 11 or remote server 420) as part of an operation that a controller 210 is configured to execute (e.g., as, or as part of, a commissioning operation). During such methods, the controller 210 may receive inputs and transmit outputs from various other components or external devices. In particular, the present disclosure is further directed to methods, such as commissioning a domestic appliance (e.g., second appliance 11). In certain embodiments, such methods may advantageously facilitate connecting an appliance to a secured, local, wireless network (e.g., local network through a router 400) or added to a user account in an easy and secure manner.

Turning especially to FIG. 5, the method 500 may be performed by a controller, for example, of a new appliance (e.g., domestic appliance) to be commissioned with a remote user interface device. At 510, the method 500 includes opening a connection channel at a wireless access point on the domestic appliance (e.g., according to a predetermined timeout period). As described above, opening the connection channel may include enabling a wireless access point (e.g., soft AP) such that a remote user interface device may scan for and identify the wireless access point. For instance, the wireless access point may be identified by the SSID format. In some embodiments, the connection channel is a single-device channel. Thus, only a single device may be permitted to connected to the wireless access point at any one time. In additional or alternative embodiments, the connection channel includes a transport layer security (TLS) protocol. Moreover, as described above, the access point may be configured to close the open connection channel in response to expiration of the timeout period wherein no communication is established.

At 520, the method 500 includes establishing communication between a remote user interface device and the wireless access point via the open connection channel. For instance, once the connection channel is recognized (e.g., prior to a predetermined timeout period expiring) the remote user interface device may select the open connection channel. Thus, communication signals may be transmitted between the domestic appliance (e.g., at the wireless access point) and the remote user interface device.

At 530, the method 500 may include receiving a network credential from a previously-commissioned appliance, subsequent to 520. In some embodiments, the network credential is received through the remote user interface device. For instance, As described above, the remote user interface device may transmit a request to a remote server to add the new appliance to a user account (e.g., prior to 510 or 520). The request to add the new appliance may prompt the remote server to transmit a request to the previously-commissioned appliance (e.g., after identifying the previously-commissioned appliance from a set of user-associated appliances). Moreover, the request transmitted from the remote server may include a public key of the new appliance to encrypt the network credential, as described above. In response, the previously-commissioned appliance may transmit the network credential (e.g., as an encrypted credential to the remote server). In response to receiving the network credential, the remote server may transmit the network credential to the remote user interface device before erasing the network credential from the remote server (e.g., such that the network credential is erased at the remote server in response to the network credential being transmitted through the remote user interface device). Thus, the network credential may be transmitted to the remote user interface device from the remote server prior to receipt of the network credential at the domestic appliance. Additionally or alternatively, the remote server may identify the previously-commissioned appliance from the set of user-associated appliances and transmits a request for the network credential to the previously-commissioned appliance prior to receipt of the network credential (i.e., at the new appliance) through the remote interface device.

At 540, the method 500 includes, subsequent 530, the new appliance applying the network credential to connect the new appliance directly to a corresponding local wireless network (e.g., the local network provided by the router), as described above. In some embodiments, 540 includes decrypting the network credential using the corresponding public key. Moreover, as also described above, the previously-commissioned appliance may already be connected directly to the local wireless network (i.e., the same wireless network as the new appliance).

Turning especially to FIG. 6, the method 600 may be performed by a controller, for example, of a remote server commission a new appliance (e.g., with a remote user interface device). At 610, the method 600 includes receiving a commissioning request for the new domestic appliance at the remote server. For instance, the commissioning request may be received from the remote user interface device, as described above.

At 620, the method 600 includes transmitting a request for a network credential of a local wireless network to a previously-commissioned appliance (e.g., in response to 610). Specifically, the request at 620 may be transmitted through the local wireless network that the previously-commissioned appliance is connected to (e.g., a local wireless network provided by a router). Additionally or alternatively, the request may be transmitted with a public key of the new appliance to encrypt the network credential. As part of the method 600, the remote server may identify the previously-commissioned appliance from a set of user-associated appliances prior to transmitting the request for the network credential, as described above. Moreover, identifying the previously-commissioned appliance may be in response to receiving the commissioning request.

At 630, the method 600 includes receiving the network credential from the previously-commissioned appliance. Specifically, the network credential (e.g., an encrypted duplicate thereof) may be transmitted to the remote server from the previously-commissioned appliance in response to the previously-commissioned appliance receiving the request at 620.

At 640, the method 600 includes transmitting the network credential to the domestic appliance (e.g., in response to receipt of the network credential at 630). In some embodiments, the 640 includes transmitting the network credential through the remote user interface device, as described above. For instance, the remote user interface device may be in direct communication with the domestic appliance via a wireless connection channel. Once the network credential is received at the new appliance, the network credential appliance may be decrypted and applied such that the remote server communicates directly with the new domestic appliance through the wireless network subsequent to transmitting the network credential to the domestic appliance.

In certain embodiments, the method 600 further includes erasing the network credential at the remote server in response to transmitting the network credential to the domestic appliance. Thus, no record of the network credential may be stored outside of the commissioned appliances (e.g., the previously-commissioned appliance and the new appliance).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of commissioning a domestic appliance, the method comprising:

opening a connection channel at a wireless access point on the domestic appliance;

establishing communication between a remote user interface device and the wireless access point via the open connection channel;

directing addition of the domestic appliance to a user account subsequent to establishing communication between the remote user interface device and the wireless access point;

prompting transmission of a request for a network credential to a previously-commissioned appliance in response to directing addition of the domestic appliance; and receiving the network credential at the domestic appliance from the previously-commissioned appliance in response to prompting transmission of the request to the previously-commissioned appliance, wherein the network credential is received through the remote user interface device, wherein the network credential is transmitted to the remote user interface device from a remote server prior to receipt at the domestic appliance wherein, prior to receipt of the network credential through the remote user interface device, the remote server identifies the previously-commissioned appliance from a set of user-associated appliances and transmits the request for the network credential to the previously-commissioned appliance, and wherein the network credential is erased at the remote server in response to the network credential being transmitted through the remote user interface device.

2. The method of claim 1, wherein the connection channel is single-device channel.

3. The method of claim 1, further comprising applying the network credential to connect the domestic appliance directly to a corresponding wireless network.

4. The method of claim 3, wherein the previously-commissioned appliance is connected directly to the corresponding wireless network.

5. The method of claim 1, wherein the connection channel comprises a transport layer security protocol.

6. A method of commissioning a domestic appliance, the method comprising:

receiving a commissioning request for the domestic appliance at a remote server;

transmitting a request for a network credential of a local wireless network to a previously-commissioned appliance from the remote server through the local wireless network in response to receiving the commission request, the request being transmitted through the local wireless network;

receiving the network credential from the previously-commissioned appliance;

transmitting the network credential to the domestic appliance;

identifying the previously-commissioned appliance from a set of user-associated appliances prior to transmitting the request for the network credential and in response to receiving the commissioning request and erasing the network credential at the remote server in response to transmitting the network credential to the domestic appliance.

7. The method of claim 6, wherein the commissioning request is received from a remote user interface device.

8. The method of claim 6, wherein transmitting the network credential to the domestic appliance comprises transmitting the network credential through a remote user interface device, the remote user interface device being in direct communication with the domestic appliance via a wireless connection channel.

9. The method of claim 8, wherein the wireless connection channel is single-device channel.

10. The method of claim 8, wherein the connection channel comprises a transport layer security protocol.

11. The method of claim 6, further comprising communicating directly with the domestic appliance through the local wireless network subsequent to transmitting the network credential to the domestic appliance.

* * * * *